July 17, 1934.  J. B. ARMITAGE  1,966,699
MILLING MACHINE TRANSMISSION AND CONTROL MECHANISM
Filed July 8, 1933   6 Sheets-Sheet 1

INVENTOR
Joseph B Armitage
BY
Fred A Parsons
ATTORNEY

July 17, 1934.  J. B. ARMITAGE  1,966,699
MILLING MACHINE TRANSMISSION AND CONTROL MECHANISM
Filed July 8, 1933   6 Sheets-Sheet 5

INVENTOR
Joseph B Armitage
Fred G Parsons
ATTORNEY

Patented July 17, 1934

1,966,699

UNITED STATES PATENT OFFICE 1,966,699

MILLING MACHINE TRANSMISSION AND CONTROL MECHANISM

Joseph B. Armitage, Wauwatosa, Wis., assignor to Kearney & Trecker Corporation, West Allis, Wis.

Application July 8, 1933, Serial No. 679,515

14 Claims. (Cl. 90—21)

This invention relates to milling machines and more particularly to a transmission and control mechanism providing for the use of attachments with such machines.

An object is to provide an improved attachment drive and control mechanism, particularly for table attachments, such as dividing heads, or similar attachments, which require a branch transmission line for the actuation thereof.

Another object is to provide a table train and control structure improved to serve both its normal purpose of table drive and control and to likewise serve for driving and controlling attachments, particularly those where the attachment requires a branch line transmission and such branch line is required to drive in controlled timing with respect to the movements of the machine table.

Another object relates to the construction of attachment drive and control mechanism in units such as to be readily and easily removed and replaced on the machine, and particularly where the attachment requires a branch line transmission which must be disconnected or connected during the process of removing and replacing the attachment.

A further object relates to improved means for accomplishing the various objects mentioned where the attachment is of the particular form generally known as a dividing head.

A further object is to simplify and improve upon the somewhat similar purpose structure of the Patents No. 1,670,794, issued May 22, 1928, and No. 1,626,001, issued April 26, 1927.

Still other objects will be apparent from the specification and claims and the invention consists in the machine as herein described and claimed and in such modifications thereof as are equivalent to the structure claimed.

In the drawings like reference characters have been used to designate the same parts in each of the views.

Figure 1:
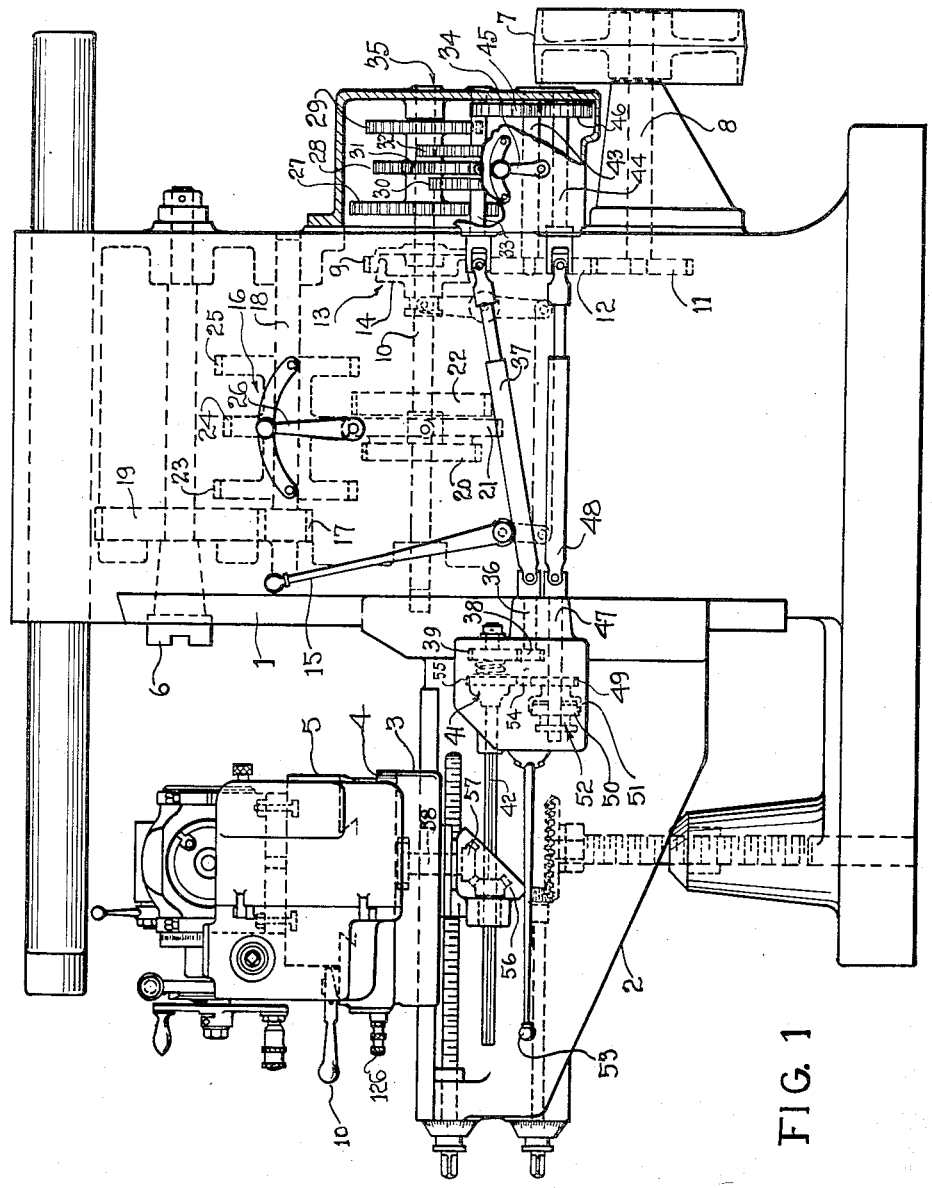
Fig. 1 is a side view of a milling machine incorporating the invention.

The milling machine includes a column 1 on which is guided a vertically adjustable knee or support 2, which supports and guides a transversely movable saddle or support 3 upon which is swivelled a support or block 4 upon which table 5 is slidably guided for longitudinal movements. The slides or guides for table movement in the three different paths and for angular settings of swivel block 4 are of the usual or any suitable form and therefore will not be described in detail. A tool support or spindle 6 is journaled in column 1 which likewise supports a pulley 7 from which power is derived for the various trains of the machine.

The knee 2 and saddle 3 may be, and ordinarily are, provided with means both for manual actuation thereof and also for power actuation, as from pulley 7. Also the knee, saddle and swivel block may be, and ordinarily are, provided with suitable manually operable clamping devices for fixing the position thereof.

A train for rotation of spindle 6 from pulley 7 is as follows: Pulley 7 is fixed to a shaft 8, Fig. 1, and drives a gear 9, rotatable on a shaft 10, through gears 11, 12. A clutch generally denoted by numeral 13 includes a shiftable element 14 adapted to be engaged or disengaged with a complementary element of gear 9 by the means of a hand lever 15, whereby to engage or disengage shaft 10 from the pulley 7. Shaft 10 drives spindle 6 through a rate changer generally denoted by numeral 16, and through a gear 17 on shaft 18 meshing with gear 19 fixed on the spindle. Rate changer 16 consists of gears 20, 21, 22 fixed together and slidably keyed on shaft 10 for engagement one at a time with complementary gears 23, 24, 25 fixed on shaft 18, the gears being connected to be shifted by a hand lever 26.

Figure 5:
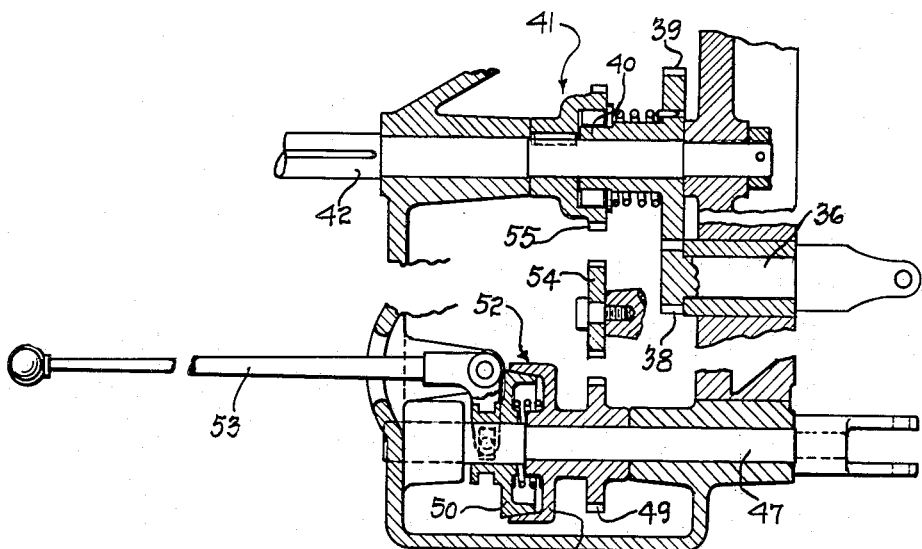
Fig. 5 is an enlarged development of a part of the transmission and control mechanism shown in Fig. 1.
Figure 6:
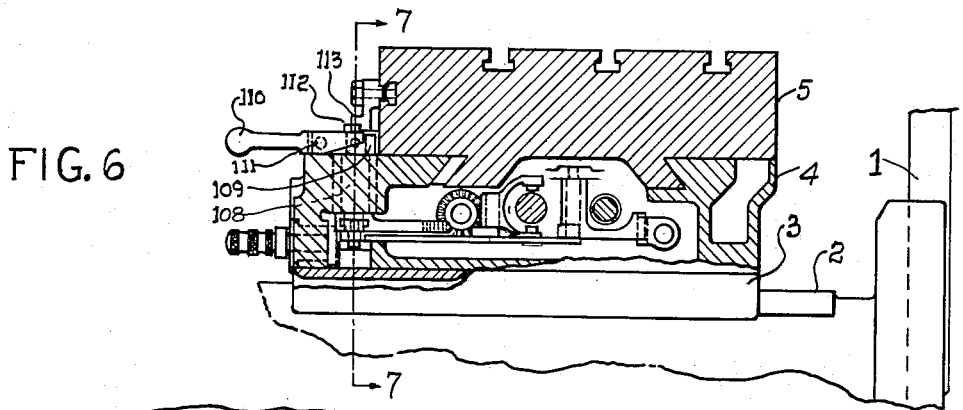
Fig. 6 is a partial section along line 6—6 in Fig. 4.

The pulley 7 also drives a feed train as follows: Shaft 10 is extended rearwardly, Fig. 1, and has fixed thereon the gears 27, 28, 29, adapted for engagement one at a time by the complementary gears 30, 31, 32, slidably keyed on a shaft 33, and fixed together to be shifted by the means of a hand lever 34, and together providing a rate changer generally denoted by the numeral 35. Shaft 33 drives a shaft 36 rotatably supported on knee 2, through an extensible universal joint shaft generally denoted by the numeral 37. A gear 38 on shaft 36 engages a gear 39 which is fixed with a terminal member 40, Fig. 5, of an overrunning clutch of any suitable form, generally denoted by numeral 41, the gear and member being rotatably supported on a shaft 42.

A quick traverse train is driven from pulley 7 independently of clutch 13. The pulley 7 drives gears 11 and 12, as before mentioned. Gear 12 is fixed on a shaft 43 which drives a shaft 44 through gears 45 and 46. Shaft 43 drives a shaft 47 rotatably supported on knee 2, through an extensible universal joint shaft generally denoted by numeral 48. Shaft 47 rotatably supports gear 49 which may be engaged or disengaged with the shaft by the means of a slidably keyed clutch member 50 engageable with a complementary member 51 fixed with gear 49, the two clutch members forming a clutch generally denoted by numeral 52. When clutch 52 is engaged by the means of a hand lever 53, shaft 47 drives shaft 42 through the gear 49, an idler 54, and a gear 55 fixed on shaft 42 and fixed with the other element of overrunning clutch 41. When clutch 52 is disengaged, shaft 42 is driven from the feed terminal element 40 of the overrunning clutch.

Transmission of feed or quick traverse from shaft 42 to table 5 is through the following train: A bevel gear 56, Fig. 1, is slidably keyed on shaft 42 and drives a gear 57, Fig. 3, fixed on a shaft 58 on which is also fixed a gear 59. Gear 59 drives the oppositely running bevel gears 60 and 61 through an idler 62, the gear 63 and bevel gear 64. Between the bevel gears 61, 62 is a clutch member 65, Fig. 2, having end teeth complementary to clutch teeth on the respective bevel gears, and slidably keyed on a sleeve 66 which in turn is slidably keyed on a table screw 67 rotatively fixed with table 5 by suitable thrust bearings. Screw 67 is threadedly engaged with a nut 68, Fig. 3, fixed with swivel block 4. The clutch member 65 and associated parts provides a reverser generally denoted by the numeral 69 which may be operated by control mechanism, as later explained.

Figure 2:
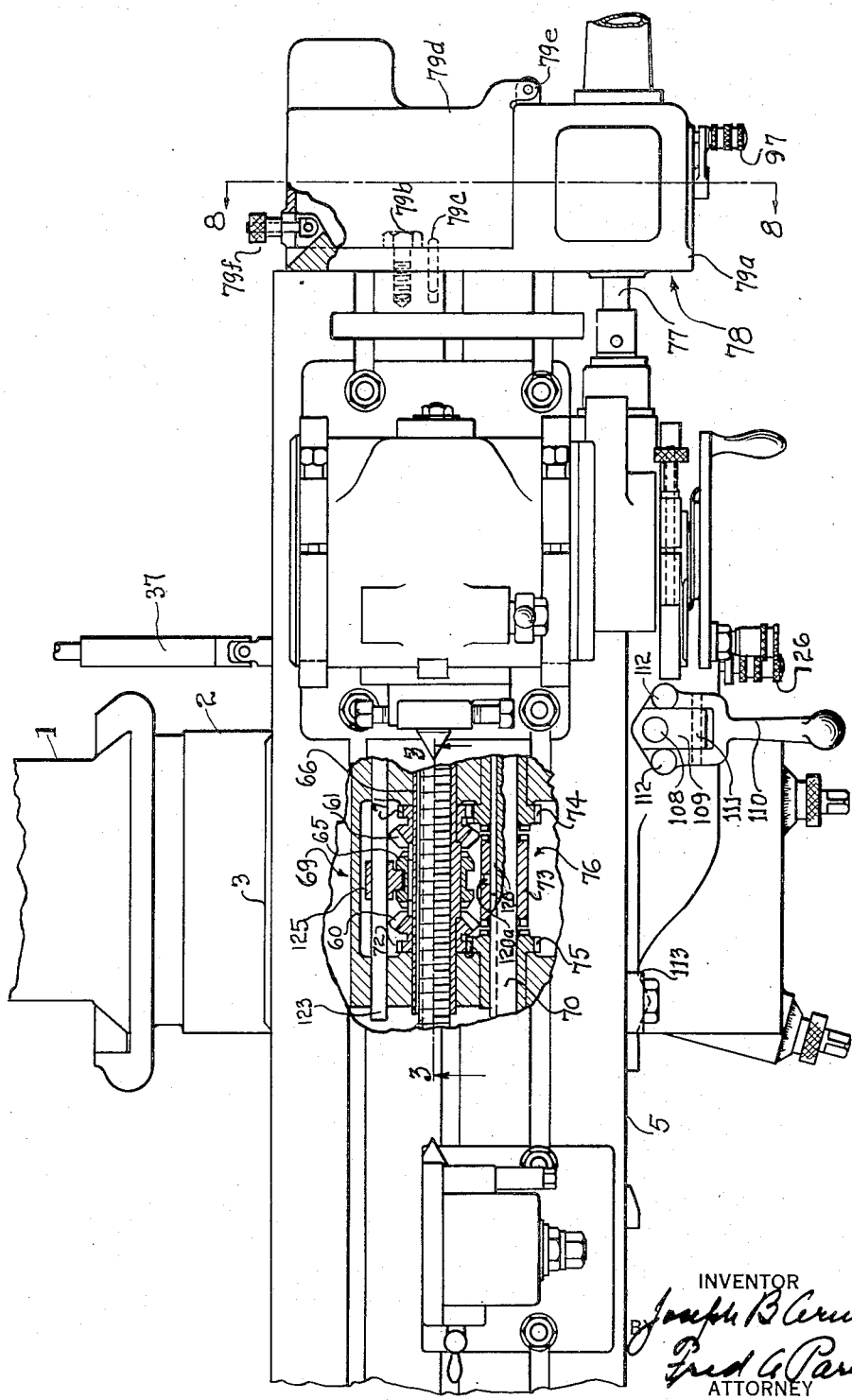
Fig. 2 is a partial plan view of the same machine.
Figure 4:
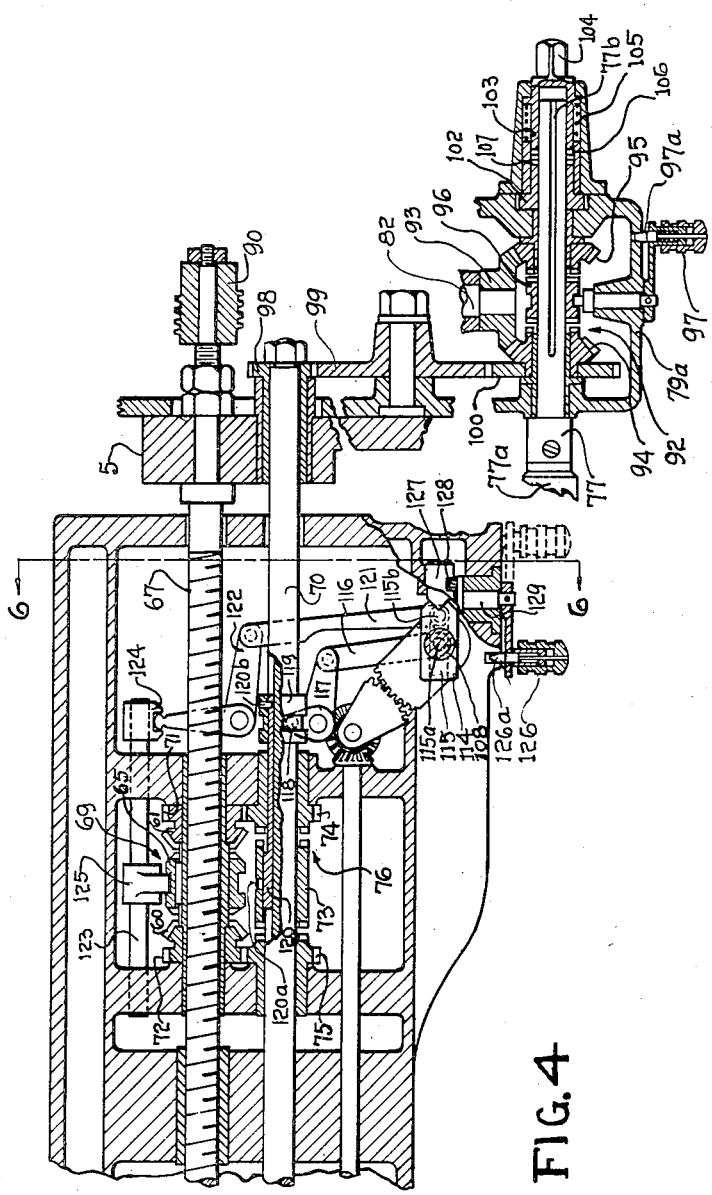
Fig. 4 is a development of a part of the table and attachment transmission.

A shaft 70, Figs. 2 and 4, lies parallel to the table screw 67 and is rotatably supported for movement with table 5. Shaft 70 may be driven from bevel gears 60 and 61 through the one or the other of oppositely running gears respectively driven from the bevel gears by the gears 71, 72. A clutch member 73 is slidably keyed on the shaft 70 and is provided with end teeth adapted to engage complementary clutch teeth on the gears 74, 75, the clutch member 73 and associated parts forming a reverser generally denoted by the numeral 76 which may be operated by control mechanism as later explained.

Figure 3:
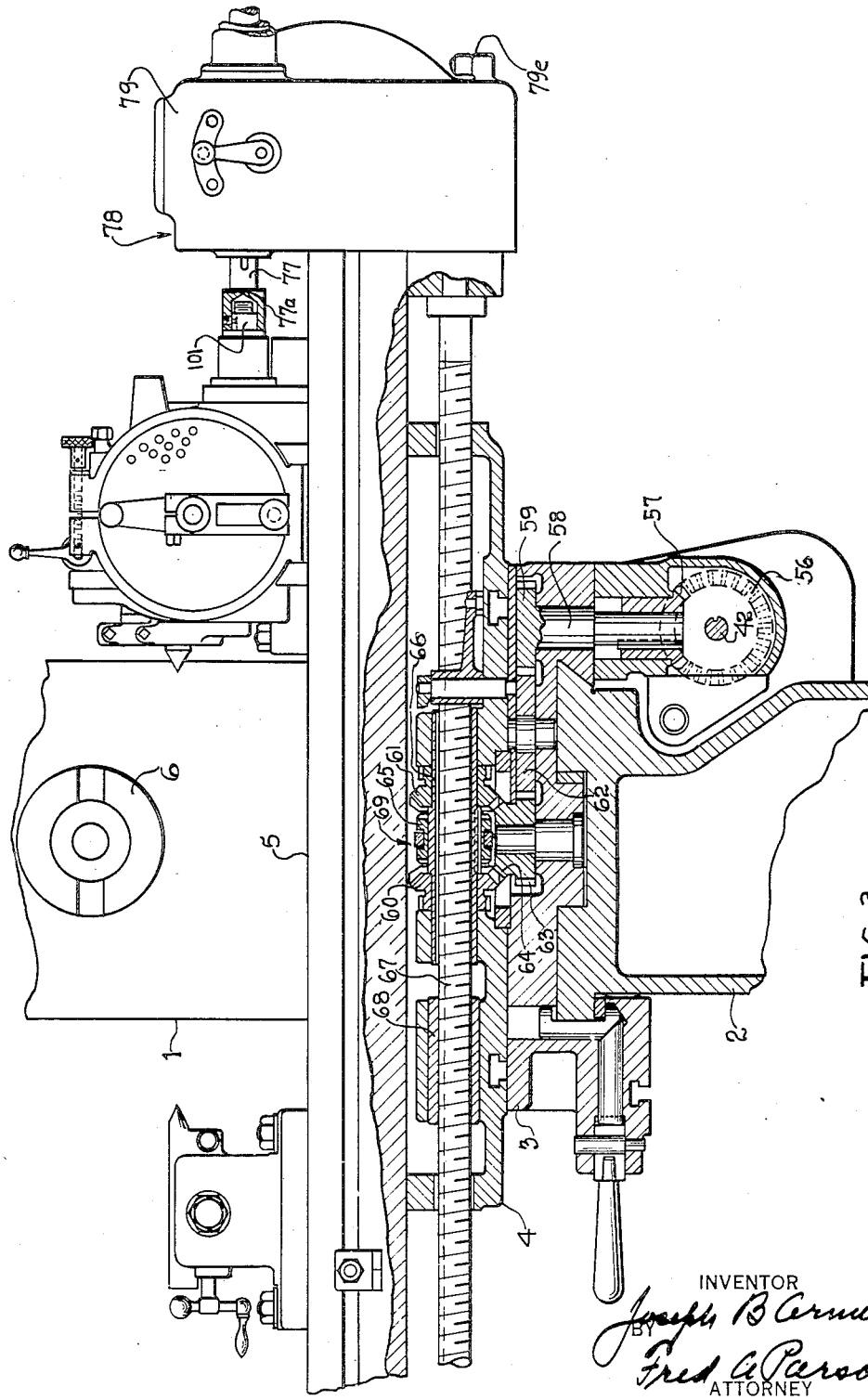
Fig. 3 is a partial front view of the same machine partially in section along line 3—3 of Fig. 2.

An attachment drive shaft 77, Figs. 2, 3, and 4, may be alternatively connected to be driven in unison with the screw 67 for driving attachments in predetermined timed relation to the table movement, or to be driven independently of the screw 67 from the shaft 70. Also if shaft 77 and screw 67 are connected to be driven in unison, they may be alternatively connected to be driven primarily from the shaft 70 or primarily from the screw 67. The means whereby the various connections are effected consists of a unitary mechanism generally denoted by the numeral 78, Figs. 2, 3. The unitary mechanism 78 is removably supported at the end of table 5 in a box or housing 79a forming a bracket held in position and located by the means of screws such as 79b, Fig. 2, and dowels such as 79c, positioned at appropriate points. Housing 79a includes a cover portion 79d, hinged as at 79e, but normally retained closed by the means of a latch, such as 79f.

Figure 8:
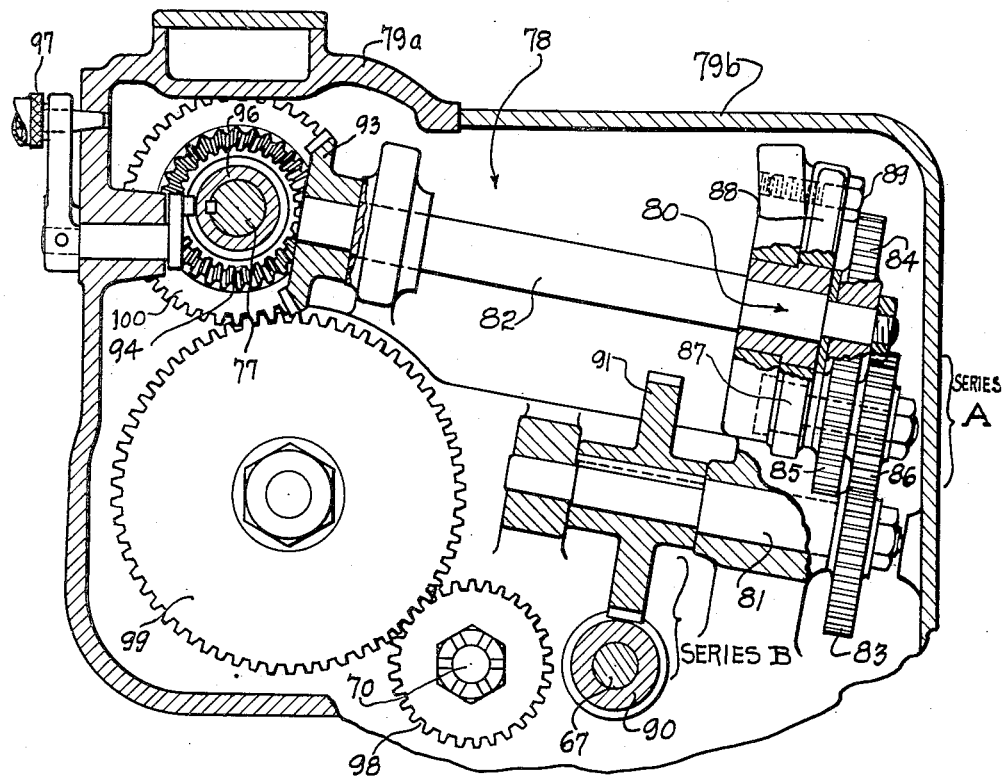
Fig. 8 is an enlarged partial section along line 8—8 in Fig. 2.

For connecting the attachment drive shaft 77 with the screw 67 to rotate in unison, a rate changer is provided, carried by housing 79a. This rate changer is generally indicated at 80, Fig. 8, and includes two series of gears, series A and series B, as indicated in Fig. 8. The gears of series A include a number of spur gears of relatively slight difference in teeth and diameter, arranged to connect two shafts 81, 82, there being a gear 83 on the shaft 81, a gear 84 on the shaft 82, and a pair of gears 85, 86, respectively engaging the gears 84 and 83 and rotating on a stud 87 carried by a bracket 88 which swivels about the center of shaft 82, the bracket being slotted for the stud 87 and fixed in position by screw 89. Each of the gears of series A is mutually interchangeable in position and the gears shown, together with other gears of the series provide a large number of rate changes of relatively small increment of rate change in an approximately arithmetical progression. The gears of series B include a number of complementary pairs of gears for connecting screw 67 and shaft 81 and illustrated in Fig. 8 by the gear 90 removably fixed on screw 67, as more particularly shown in Fig. 4, and a gear 91 removably fixed on shaft 81. The various pairs of gears of which gears 90, 91 are typical are reversible in position and of relatively large ratio, the several pairs in their different positions providing a series of rate changes of relatively large steps in an approximate geometrical progression and a relatively very large total range. The gaps between the steps of the geometrical progression derived from the series B gears are substantially filled by the arithmetical progression of rates obtained from the series A gears, and the combined effect of the rate changer is an extremely large range and number of rate changes of relatively small increments, and obtained in a very simple manner with an extremely compact mechanism.

The shaft 82, connected with screw 67 by the rate changer 80 as described, is in turn connected with attachment drive shaft 77 through a reverser generally denoted as 92, Fig. 4, and consisting of a bevel gear 93 engaging the bevel gears 94, 95 having clutch faces alternatively engageable by complementary end clutch faces of a clutch member 96, slidably keyed on shaft 77 and shiftable to the one or the other position by the means of a hand lever 97.

The connection of shaft 70 to the attachment drive shaft 77 also passes through the reverser 92 and includes a gear 98, Figs. 4, 8, fixed on shaft 70, an idler 99, and a gear 100 fixed on the bevel gear 94.

In the drawings, Fig. 3, the attachment drive shaft 77 is shown provided with an end coupling element 77a, adapted for driving engagement with a power shaft of an attachment such, for instance, as the shaft 101 of the dividing head of the copending application of Edward J. Kearney and Joseph B. Armitage, Serial No. 659,828, filed March 6, 1933.

For transmitting the adjustment of attachments along table 5 while still maintaining a driving connection with shaft 77, the shaft is extended and arranged to slide axially to the left in Fig. 4, while still maintaining a slidably keyed connection with the reverser clutch member 96 through the elongated keyway 77b.

Manual means are provided for rotating the attachment drive shaft 77, consisting of a clutch member 102 in which shaft 77 is slidably splined and a clutch member 103 having a squared end portion 104 for a hand crank (not shown) and which may be pressed against the resistance of a spring 105 for the end clutch teeth 106 of the member 103 to engage complementary teeth 107 of the member 102.

Figure 7:
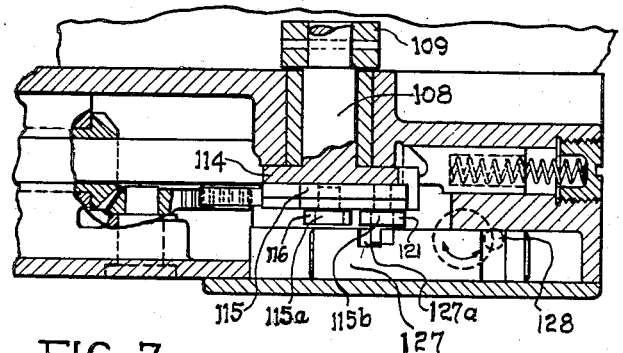
Fig. 7 is an enlarged section along line 7—7 in Fig. 6.

The control mechanism for the reversers 69, 76 will now be described. A trip post 108, Figs. 2, 7, has fixed on the upper end thereof a block 109 upon which a member 110 is pivoted at 111. Member 110, together with the trip post, swings to right or left from the central position shown in Fig. 2 whereby the one or the other of lugs 112 is positioned in the path of dog members such as 113, fixed on table 5, which during the course of the table movement engage the lugs 112 to return the post 108 to its central position. At its lower end the post 108 is provided with a slotted head 114, Figs. 4, 7, in which is slidable a block 115 which carries pins 115a, 115b respectively connected with the reversers 76, 69. Pin 115a connects with the clutch member 73 of reverser 76 by the means of a pivoted link 116, Fig. 4, a pivoted bell crank 117 having a pin 118 engaging an annular groove in a spool 119, and a bar 120 slidable in a suitable spline in shaft 70 and which has lugs or pins 120a, 120b respectively engaging the clutch member 76 and the spool 119. Pin 115b connects with the member 65 of reverser 69 by the means of a pivoted link 121, Fig. 4, a bell crank 122, and a rod 123 having a member 124 engaged by the bell crank and a fork 125 engaging an annular groove in the shiftable clutch member 65. The shiftable block 115 is movable by the means of a lever 126, Fig. 4, to two positions, respectively positioning the pins 115a and 115b to be offset from the axis of trip post 108, the other pin being simultaneously moved to axially coincide with the trip post. The means for such effect consists of a slidable member 127, Fig. 7, having an arcuate slot 127a which engages an extended portion of pin 115b while permitting the pin to swing with the post, the member 127 being shifted by an eccentric lug 128, Fig. 4, engaging a slot in member 127 and connected by a shaft 129 to move with lever 126. A spring plunger 126a engages suitable recesses in the swivel block 4 whereby to define the two positions of lever 126 and slidable member 115. In the one position of lever 126 the clutch member 73 of reverser 76 is held immovable in disengaged position and the clutch member 65 of reverser 69 may be engaged in either direction by the hand lever 110 and disengaged by the lever or by table dogs such as 113. In the other position of lever 126 the clutch member 65 is similarly held fixed in disengaged position and the clutch member 73 may be similarly hand and dog operated.

When the table attachment is of such nature as to require no interconnection with the table screw, the attachment drive shaft 77 is driven from shaft 70. In such event the lever 126 is positioned for clutch member 65 to be held disengaged and the attachment drive is through the gears 98, 99, 100, etc. and may be controlled either by the lever 110 and reverser 76, or by lever 97 and reverser 92. In such cases the gears of rate changer 80 may be disconnected in any of several obvious ways in order that the screw 67 will not be driven from bevel gear 93. One method of such disconnection is to remove some of the gears of the rate changer. Another method is to swing the bracket 88 to disengage the gears.

Where the table attachment is such as to require interconnection of the table screw 67 and the attachment drive shaft 77, the rate changer 80 is used to determine the ratio of relative movement. For the dividing head herein shown it is sometimes necessary to adjust rate changer 80 for a relatively very rapid rotation of shaft 77, as, for instance, in cutting helical grooves of short lead, and again for a relatively very slow rotation of shaft 77, as, for instance, for helical grooves of long lead. For the relatively very rapid rotation of shaft 77, the drive is from the shaft 70 and the hand lever 126 is adjusted for the reverser 76 to be controlled by lever 110 and dogs 113 whereby to start and stop the train. For the relatively very slow rotation of shaft 77, the drive is from screw 67 and the lever 126 is adjusted for the reverser 69 to be controlled by lever 110 and dogs 113. In either event, the lever 97 may adjust the reverser 92 to change the direction of rotation of shaft 77 relative to screw 67 whereby, for instance, to change the helical groove from right to left-hand lead, or vice versa, the lever 97 having two positions respectively for right and for left-hand leads and defined by a spring plunger 97a engaging with suitable recesses in the housing member 79a.

What is claimed is:

1. In a milling machine having a reciprocable support, the combination of a screw and nut for support movement and one of which is rotatable, a rotatable shaft axially parallel with said screw, driving means for said rotatable members including a plurality of motion interruptors, a trip device operable in accordance with the movement of said support, and motion transmitting connections alternatively connectible from said trip device to the one or the other of said motion interruptors.

2. In a milling machine having a reciprocable support, the combination of a screw and nut for support movement and one of which is rotatable, a rotatable shaft axially parallel with said screw, driving means for said rotatable members including a plurality of reversers, a manually operable shifting device, and motion transmitting connections alternatively connectible from said trip device to the one or the other of said reversers.

3. In a milling machine having a reciprocable support, the combination of a screw and nut for support movement and one of which is rotatable, a rotatable shaft axially parallel with said screw, driving means for said rotatable members including a plurality of reversers, a manually operable shifting device, means for selectively connecting said shifting device for the operation of either of said reversers exclusive of the other reverser, and trip means operable in accordance with the movement of said support for shifting the reverser selected by said means and exclusive of said other reverser.

4. In a milling machine, the combination of a reciprocable support, an attachment, a train connecting said support to be actuated in unison with said attachment and including gearing of reversible mechanical advantage whereby to selectively actuate either said attachment or said support at a relatively high rate, a feed rate train including a rate changer, a rapid traverse train, an intermediate transmission member, means for selectively actuating said member from the one or the other of said feed or rapid traverse trains, and means for connecting said member to actuate the first mentioned train to alternatively actuate said support through said gearing or exclusive thereof.

5. In a milling machine, the combination of a reciprocable support, an attachment, a train connecting said support to be actuated in unison with said attachment and including a first series of gears productive of rate changes in geometrical progression and a second series of gears productive of rate changes in arithmetical progression, and feed and rapid traverse trains alternatively available and selectively connectible to actuate said second series of gears through said first series or exclusive thereof.

6. In a milling machine, the combination of a reciprocable support, an attachment, a train connecting said support to be actuated in unison with said attachment and including gearing of reversible mechanical advantage whereby to selectively actuate either said attachment or said support at a relatively high rate, said train also including screw and nut means one of which is rotatable for actuation of said support, a shaft axially parallel with said screw, a train connectible from said shaft to the first named train to actuate said attachment from said shaft exclusive of said gearing, a feed rate train, a rapid traverse rate train, and means for selective connection of either of said feed or rapid traverse trains to primarily actuate the rotatable element of said screw and nut means or alternatively to primarily actuate said shaft.

7. In a milling machine, the combination of a reciprocable support, an attachment, a train connecting said support to be actuated in unison with said attachment and including gearing of reversible mechanical advantage whereby to selectively actuate either said attachment or said support at a relatively high rate, a plurality of power operated reversers respectively connectible with said train to actuate said support through said gearing and exclusive thereof, a trip device operable in accordance with movement of said support, motion transmitting connections alternatively connectible from said trip device to the one or the other of said reversers, and means for simultaneously selecting either reverser to be connected with said trip device and positioning the other reverser in an intermediate disengaged position.

8. In a milling machine, the combination of a reciprocable table, a dividing head attachment removably fixed on said table, a plurality of transmission members each journaled in said table and each having a portion exposed adjacent one end of said table, means for the interconnection of said members and intended for the operation of the one member from the other at a maximum rate, a minimum rate and a variety of intermediate rates, said means including rate change gearing manually interchangeable in a variety of position combinations of different rate effect and collectively productive of all said rates, a housing supporting said gearing for bodily movement with said table while coupled with each of said exposed portions, said housing being bodily detachable with said gearing, and a dividing head drive shaft connected with said gearing within said housing, said housing providing a portion shiftable when said housing is attached to said table to a position providing access to all of said gearing in any of said position combinations thereof.

9. In a milling machine, the combination of a reciprocable table, screw and nut elements one of which is rotatable for movement of said table, a coupling element carried by said table and connected with said rotatable element, a dividing head drive shaft intended to be connected with said coupling element for a maximum rate, a minimum rate and a variety of intermediate rates, a housing carried by said table and supporting said drive shaft, means for the interconnection of said element and shaft including rate change gearing within said housing and manually interchangeable in a variety of position combinations of different rate effect and collectively productive of all of said rates, said housing being bodily detachable from said table and providing a portion shiftable while said housing is attached to said table to a position providing simultaneous access to all of said gearing for effecting any of said position combinations.

10. In a milling machine, the combination of a reciprocable table, a screw for reciprocation thereof, a dividing head attachment supported on said table, and means intended to connect said screw and attachment for simultaneous actuation at different relative rates including a maximum intended rate, a minimum intended rate, and a variety of intermediate rates, and rate change means including a first series of gears interchangeable in various position combinations for a series of rates in geometrical progression, and a second series of gears in serial driving relation with said first series and interchangeable in various position combinations productive of a series of rates in arithmetical progression, said first and second gear series being collectively productive of all of said rates.

11. In a milling machine, the combination of a reciprocable table, an attachment mounted thereon and including a rotatable work spindle, a support for said table, a power train including a feed rate changer and a power element carrier by said support adjacent said table, a train connectible between said table and spindle and including reduction gearing, a plurality of alternative motion transmitting conections from said power element to said table and respectively including and excluding said reduction gearing whereby to effect substantially different rates of said table relative to said element, and power trip means operable from the reciprocatory movement of said table to interrupt said movement during actuation through either of said motion transmitting connections.

12. In a milling machine, the combination of a reciprocable table, an attachment mounted thereon and including a rotatable work spindle, a support for said table, a power train including a feed rate changer and a power element carried by said support adjacent said table, a train connectible between said table and spindle and including removable and replaceable gearing arrangeable in various combinations whereby to alter the relative table and spindle rates, a plurality of alternative motion transmitting connections from said power element to said table and respectively including and excluding some of said gearing, whereby to effect different rates of said table relative to said element, and power trip means operable from the reciprocatory movement of said table to interrupt power movement of said table and spindle during actuation through either of said motion transmitting connections.

13. In a milling machine, the combination of a reciprocable table, an attachment mounted thereon and including a rotatable work spindle, a support for said table, a feed train including a feed rate changer, a rapid traverse train excluding said feed rate changer, a power element rotatably carried by said support adjacent said table and alternatively connectible to be actuated from said feed or rapid traverse trains, a train connectible between said table and spindle and including removable and replaceable gearing arrangeable in various combinations whereby to alter the relative table and spindle rates, a plurality of alternative motion transmitting connections from said power element to said table and respectively including and excluding some of said gearing, whereby to effect substantially different rates of said table relative to said element, and power trip means operable from the reciprocatory movement of said table during either of said alternative feed or rapid traverse connections to interrupt power movement of said spindle and table during actuation through either of said motion transmitting connections.

14. In a milling machine, the combination of a reciprocable table, an attachment mounted thereon and including a rotatable work spindle, a support for said table, a feed train including a feed rate changer, a rapid traverse train excluding said feed rate changer, a power element rotatably carried by said support adjacent said table and alternatively connectible to be actuated from said feed or rapid traverse trains, a train connectible between said table and spindle including reduction gearing, a plurality of alternative motion transmitting connections from said power element to said table and respectively including and excluding said reduction gearing whereby to effect substantially different rates of said table relative to said element, and power trip means operable from the reciprocatory movement of said table to interrupt table movement in any of the driving connections thereto.

JOSEPH B. ARMITAGE.